United States Patent
Boomer et al.

(10) Patent No.: US 8,107,575 B2
(45) Date of Patent: Jan. 31, 2012

(54) METHOD AND CIRCUIT FOR CHANGING MODES WITHOUT DEDICATED CONTROL PIN

(75) Inventors: James Boomer, Monument, CO (US); Oscar Freitas, Cape Elizabeth, ME (US); Steven Macaluso, Scarborough, ME (US)

(73) Assignee: Fairchild Semiconductor Corporation, South Portland, ME (US)

( * ) Notice: Subject to any disclaimer, the term of this patent is extended or adjusted under 35 U.S.C. 154(b) by 945 days.

(21) Appl. No.: 12/112,152

(22) Filed: Apr. 30, 2008

(65) Prior Publication Data
US 2009/0110130 A1 Apr. 30, 2009

Related U.S. Application Data

(60) Provisional application No. 60/915,792, filed on May 3, 2007.

(51) Int. Cl.
*H04L 7/00* (2006.01)

(52) U.S. Cl. ......... 375/354; 370/503; 341/100; 710/305
(58) Field of Classification Search ................. 375/354; 370/503; 341/100; 710/305
See application file for complete search history.

(56) References Cited

U.S. PATENT DOCUMENTS

| | | | | |
|---|---|---|---|---|
| 2003/0058894 | A1* | 3/2003 | Feuerstraeter et al. | 370/518 |
| 2003/0217214 | A1* | 11/2003 | Calvignac et al. | 710/305 |
| 2005/0231399 | A1* | 10/2005 | Fowler et al. | 341/100 |
| 2006/0120296 | A1* | 6/2006 | Goh | 370/252 |
| 2006/0193347 | A1* | 8/2006 | Kong | 370/503 |
| 2007/0249293 | A1* | 10/2007 | Chae et al. | 455/76 |

* cited by examiner

*Primary Examiner* — Juan A Torres
(74) *Attorney, Agent, or Firm* — Cesari and McKenna, LLP; Edwin H. Paul, Esq.

(57) ABSTRACT

A system and process for eliminating a control wire between logic systems that communicate with each other. In one embodiment, a system sends to a receiver a frequency that indicates a first mode. In the first mode a first data type may be sent. When the frequency is changed a second mode is indicated wherein a second data type may be sent. The receiver detects the frequency change and assumes the first or second mode as indicated.

14 Claims, 8 Drawing Sheets

METHOD AND CIRCUIT FOR CHANGING MODES WITHOUT DEDICATED CONTROL PIN

RELATED APPLICATION

The present application is related to and claims the benefit of the provisional application, Ser. No. 60/915,792, filed on May 3, 2007, and of the same inventorship, title and ownership as the present application. The provisional application is hereby incorporated herein by reference.

BACKGROUND OF THE INVENTION

1. Field of the Invention

The present invention relates to controlling modes within an electronic package, and more particularly to controlling the modes while being efficient in the use of the contact pins on the package.

2. Background Information

Serializer/deserializer (SerDes) designs often become pin limited, thus the number of pins is important. Illustratively, the number of wires in the flexible cable found in many hand held devices is best minimized. The concern here is with the efficient use of wires and the corresponding pins, and, in particular, how to minimize the number of wires and pins but still provide the necessary functions. Herein, "connect" is defined to mean coupled or functionally connected. That is, other components may be located in the "connections."

Cell phones and other portable and hand held devices are becoming smaller and more attractive. In many cases the opening of a "clam shell" cell phone or a "slider" cell phone relies on a flexible (flex) circuit that hinges two sections and contains wires that carry the electronic signals between the sections. The present invention provides an efficient use of the pins and wires needed carry the electronic signals.

Issues and limitations exist with respect to the ability to get the number of required signals over the flex hinge and the reliability of the flex hinge. More wires suggest a larger flex circuit or smaller wires within the flex or a combination of both. Either approach reduces reliability.

The present invention is directed to these and other such issues and limitations.

SUMMARY OF THE INVENTION

The present invention provides for reducing the number of wires by sharing or multiplexing functions, wherein in one mode a signal that is required to traverse a wire for a first period of time can be used to indicate or change modes during a second period of time. Illustratively, signals over a wire are examined, but pin outs of integrated circuits may also benefit from the present invention. The present invention provides for using fewer wires in a cable, pins of an integrated circuit pins and traces on a printed circuit board.

In one example, a clock frequency may be changed to cause a mode change. For example, if a clock is used for a camera or for LCD data during a first time period, the clock frequency may be changed during a second time period and that change may indicate and command a mode change.

Illustratively, the frequency may be changed and detected, and the change may, for example, go to another frequency or zero frequency.

Illustratively, when a frequency signal on a connection from one logic system to another is not being used, the signal frequency may be altered and detected in the receiving system wherein the mode of the receiver changed in response.

For example, a clock of a given frequency may be transferred between a sender and a receiver integrated circuit that performs a given function, for example clocking in data, say data type 1, at the receiver. When no data type 1 is being sent, the clock frequency may be changed and detected at the receiver. The detected change in frequency may be used to place the receiver into a different mode of operation. For example, data type 2 may be sent instead of data type 1.

Although examples of the present invention employ a frequency change of a single clock line, frequency changes of several clock lines in combination or in combination with other logic signals may be used to provide the advantages of the present invention. Moreover, the illustrative example described below for the present invention makes a single clock frequency change from a high speed clock to a low speed clock. The change is compared to a reference frequency to determine one mode from another. However, the present invention may apply to many different clocks, but it also applies to more than one frequency change of a single (or many) clock, where each frequency change indicates a different mode.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

The present invention provides, in one illustrative embodiment, a circuit that distinguishes between two input frequencies and outputs a control signal indicating one mode when one frequency is higher than a second frequency and a different mode when the second frequency is higher than the first. The output of the circuit may be used to control dual use transmitter and receiver circuits as described below to direct signals to their proper locations as determined by the modes.

As indicated above, illustratively, a flex circuit used between parts of a hand held device might carry both LCD (liquid crystal display) signals and I2C (sometimes known as I²C) signals. Both LCD and I2C are known terms in the art. In some prior art applications a separate pin might be used to carry a control signal on the flex circuit that enables a first type of signal to be sent when the control signal is true and a second type when the control signal is false. However, the present invention provides another means for distinguishing these signals without using a wire/pin to carry the control signal.

Figure 1:
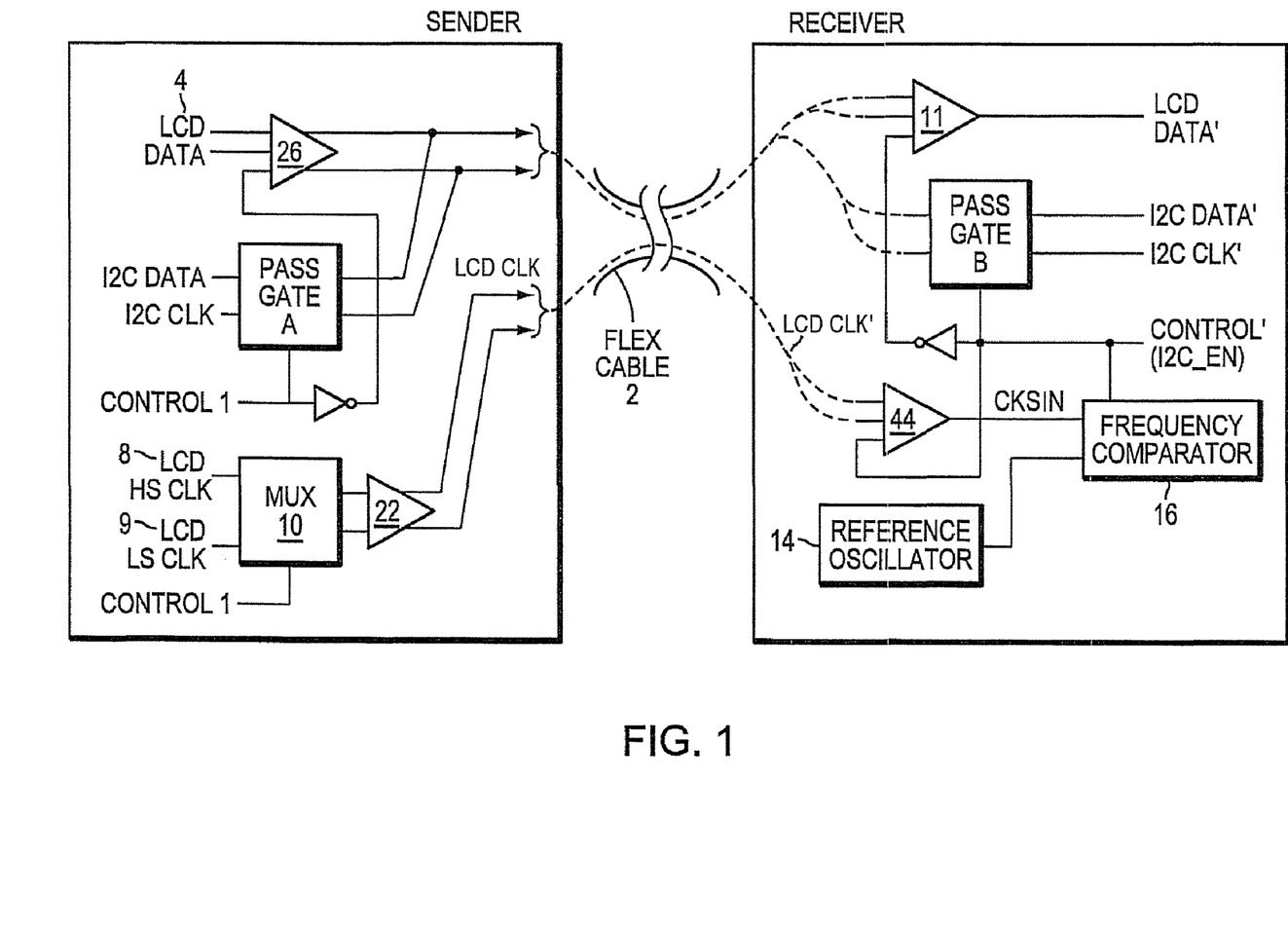
FIG. 1 is a block diagram illustrating in general the operation environment of the present invention.

The mechanism, as illustrated in FIG. 1, is to recognize that the clock signals for the LCD data may be altered for dual use when the LCD data is not being sent. In this case I2C data and I2C CLK may be transferred, instead of LCD data.

FIG. 1 shows a generic SENDER and RECEIVER with an interconnecting flex cable 2. A control signal is generated by a computer system (not shown) that generates the CONTROL 1 signal. In one condition, the CONTROL 1 may be used to pass LCD data 4 through a differential driver 6, or in the other condition to pass I2C data and an I2C clock through the pass gate A to the flex cable 2. A high speed 8 or a low speed 9 LCD is input to the multiplexer (mux) 10 that drives a transmitter 22 that, in turn, drives the flex cable 2. The CONTROL1 signal controls which mux input is placed on the flex cable.

The LCD DATA' or the I2C DATA' and CLK' (clock) is received by buffer 11 or the PAS GATE B as determined by the CONTROL' signal.

The LCD CLK' is received by the buffer 44 which outputs the CKSIN signal. The CKSIN is compared to a REF. OSCILLATOR 14 at the FREQ. The COMPARATOR 16 outputs the CONTROL' that determines which signals are received. The CONTROL' is identical with the I2C_EN signal described later.

Note in FIG. 1, the logic structures are illustrative for understanding, while a more detailed representative implementation is discussed in the other drawings. Also, note that the I2C PASS GATES A and B are bidirectional and so the I2C DATA and CLK may be passed in both directions in other applications.

Figure 2:
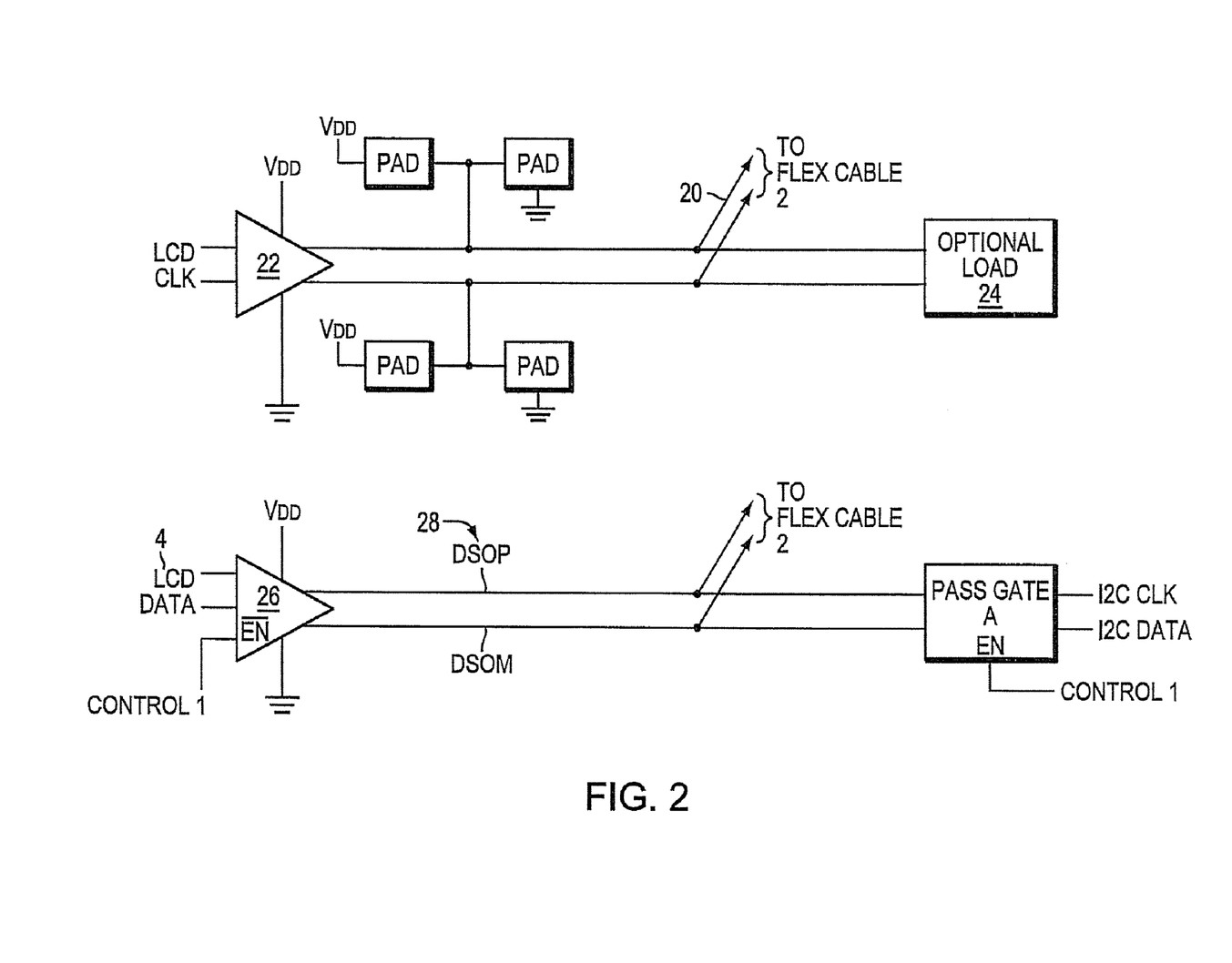
FIG. 2 is a schematic showing transmitters.

FIG. 2 illustrates an embodiment for the electronics at the SENDER of FIG. 1 driving the output pins 20 that connect to the flex cable 2. These output pins are shown connecting to a flex cable, but they might be going directly to another integrated circuit. Differential clock signals, LCD CLK, are driven by a transmitter 22 onto the output pins 20. As shown for the output pins of transmitter 22, each pin is connected to PAD's that provide Electrostatic Discharge protection (ESD). All the pins, contacts and wires in this embodiment may be so protected, although not shown in the FIGs.

"LCD" representing liquid crystal display, and "CLK" represents a clock. The dummy load 24 is optional depending on the application and simply presents a known load cable termination on the output pins 20 that connect to the flex cable.

Differential LCD DATA 4 is driven by a transmitter 26 onto differential DSOP and DSOM pins 28 that connect to the flex cable 2. When LCD DATA 4 is being sent DSOP and DSOM represent the positive and negative, respectively, signals of the differential LCD DATA.

However, when PASS GATE A is enabled, by CONTROL1, I2C CLK is presented onto DSOP and an I2C DATA is presented onto DSOM. When I2C signals are enabled by CONTROL1 onto the DSOP and DSOM lines, the LCD DATA 4 is blocked by transmitter 26, illustratively, being disabled by the CONTROL1—(the logic inverse of CONTROL1). Here CONTROL1 is a mode determining signal that may be set by a computer system (not shown) that interfaces with the SENDER. Since LCD DATA or I2C signals are placed onto the DSOP and DSOM lines, the output of transmitter 26, when unenabled, must not load the PASS GATE A, and the PASS GATE A, when unenabled, must not load the buffer 26.

Figure 3:
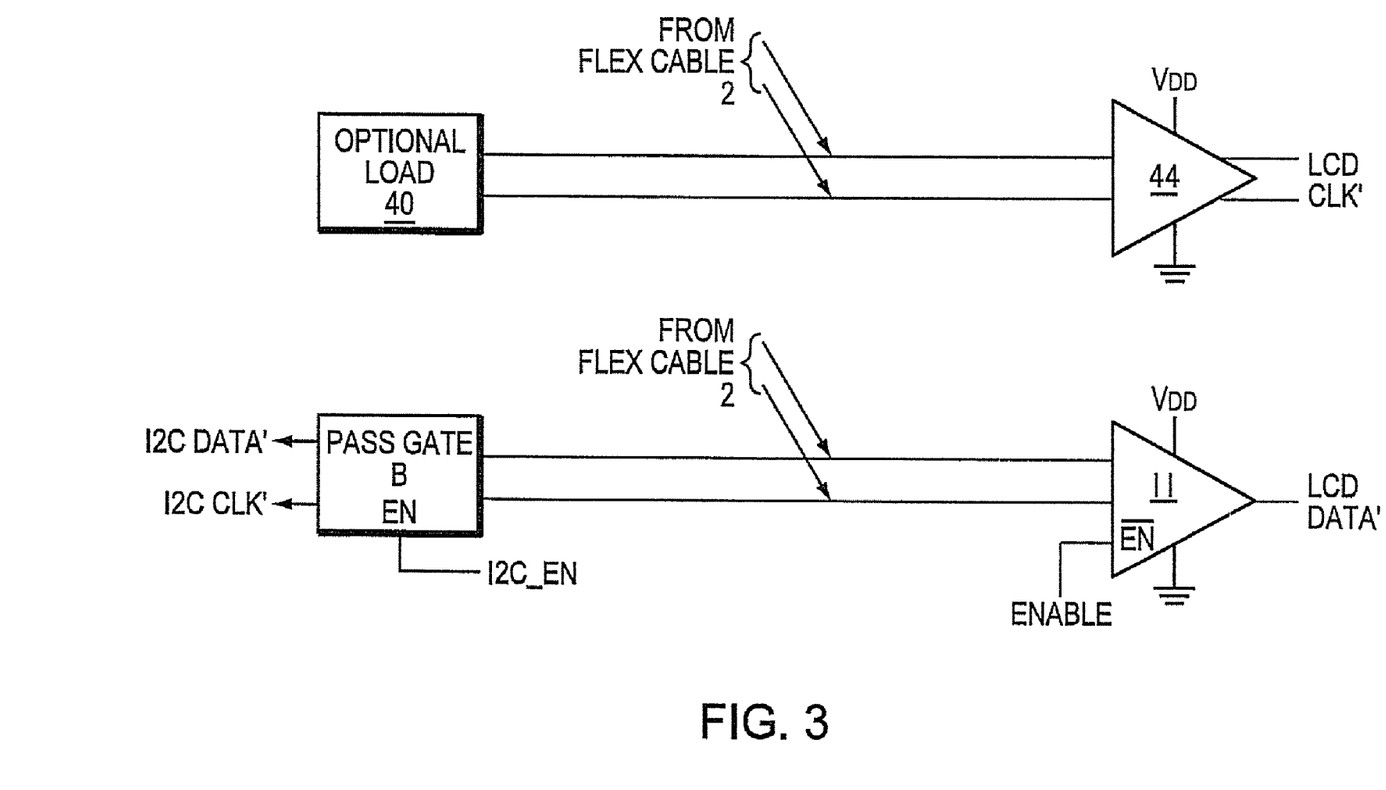
FIG. 3 is a schematic showing receivers.

FIG. 3 illustrates the RECEIVER of FIG. 1. The LCD CLK is received by an optional cable termination load 40 and the buffer 42 receive the LCD CLK signals. A buffered LCD CLK' signal is presented to other circuitry (not shown) in the RECEIVER. One of the differential LCD CLK signals, CKSIN, is presented to the Frequency comparator of FIG. 4, below.

Coincidentally, the LCD DATA (or the I2C CLK and the I2C DATA) is received 44 from the flex cable. If I2C_EN is true, I2C signals are received and passed through the PASS GATE B to other circuitry (not shown). If LCD DATA is received they are buffered by item 44 and a single ended LCD DATA' is present to the following circuitry (not shown). An ENABLE signal may be generated to prevent the LCD DATA' signals from traversing the buffer 44, if desired.

Figure 4:
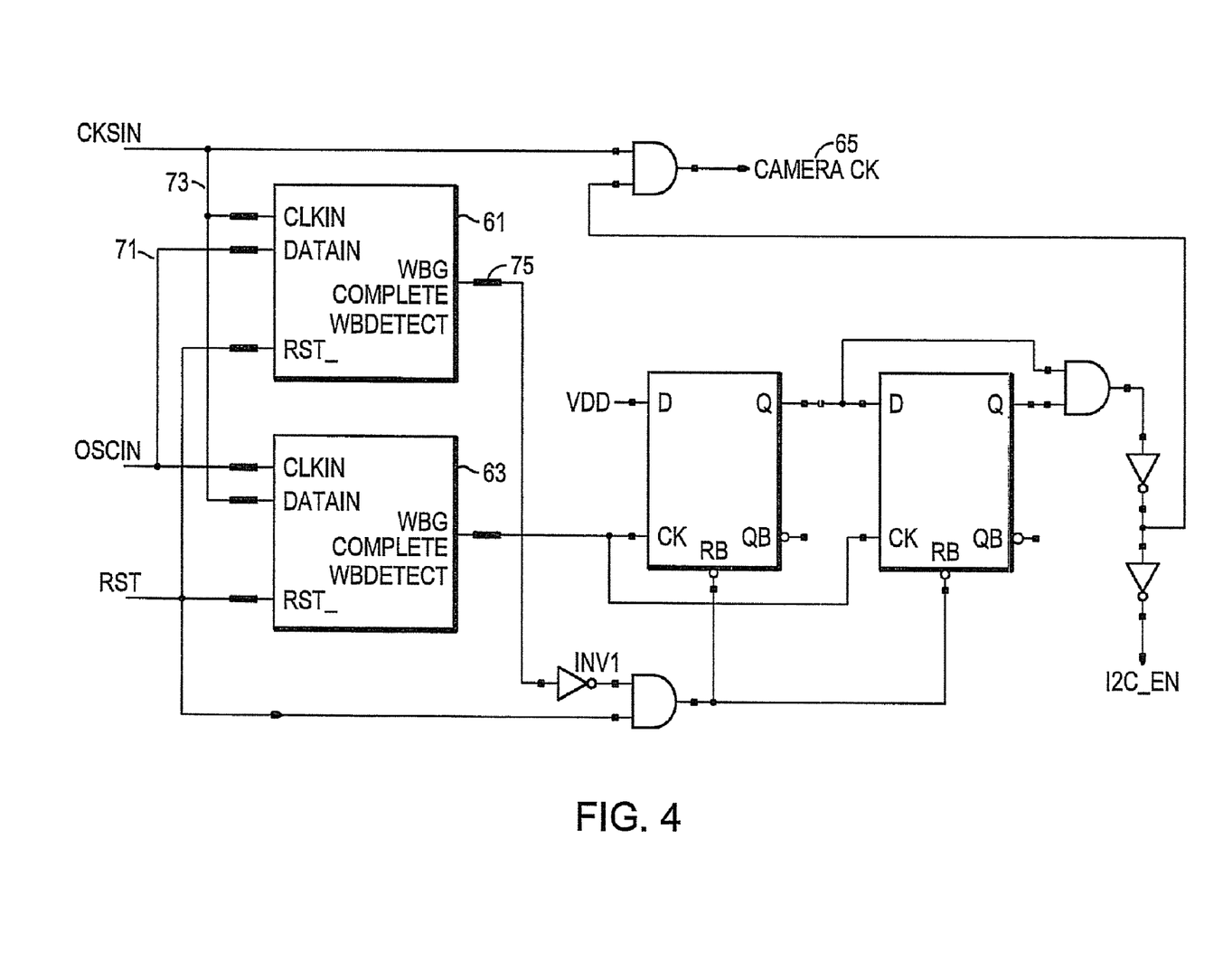
FIG. 4 is a schematic of a frequency comparator.

FIG. 4 illustrates a circuit that functions as the FREQUENCY COMPARATOR 16 of FIG. 1. Frequency detectors (formed as parallel missing pulse detectors) 61 and 63 compare the received clock signal CKSIN to a reference oscillator signal OSCIN. The output is the I2C_EN signal that directs the I2C signals traversing the flex cable or the LCD signals to the proper receiving circuitry (not shown).

In some applications, a camera clock 65 output may be provided.

Figure 5:
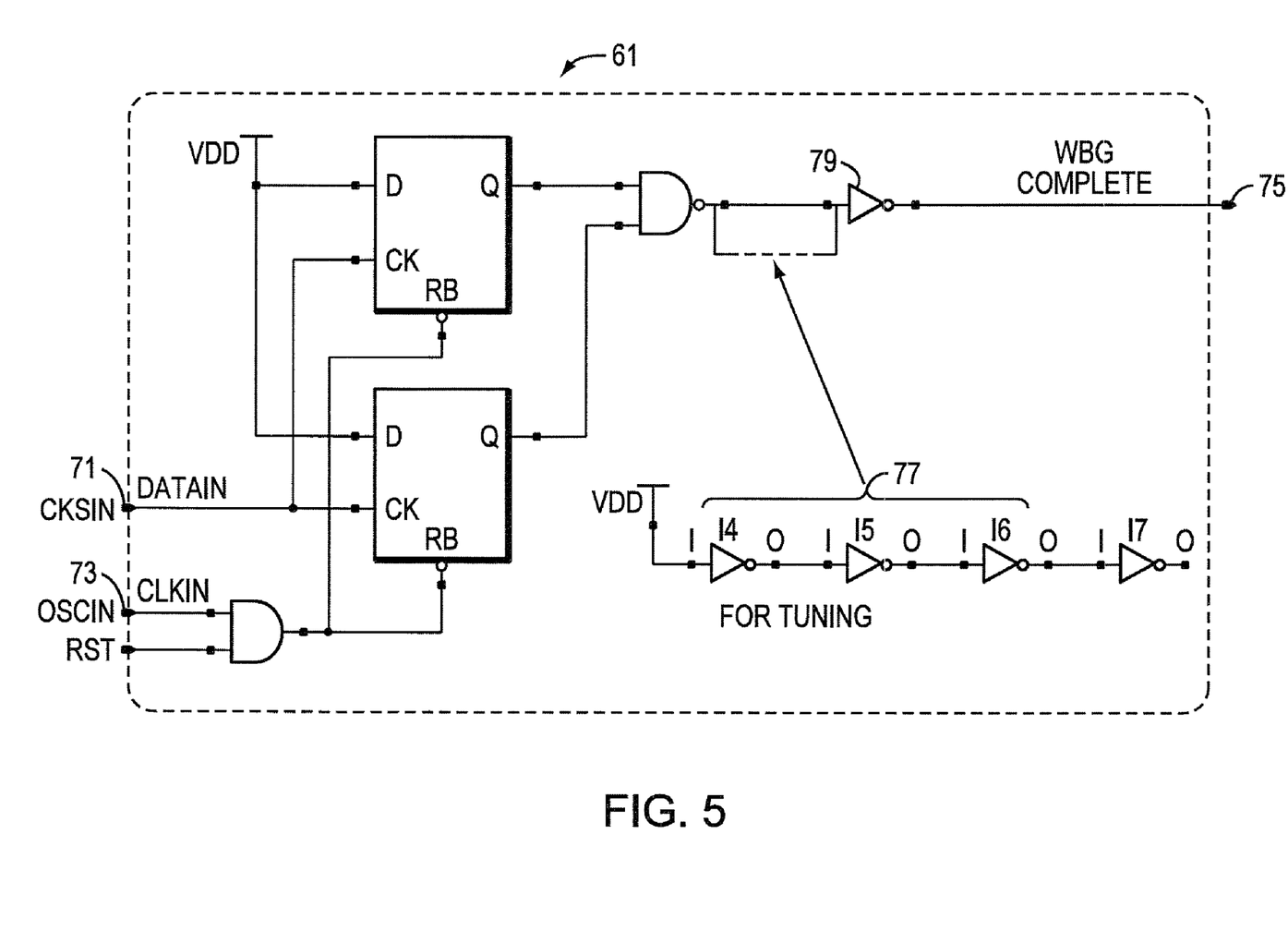
FIG. 5 is a circuit schematic detail of one circuit block of FIG. 4.

FIG. 5 illustrates a preferred embodiment of the detector 61 of FIG. 3. Item 63 is identical except the order of the OSCIN and CKSIN are reversed. CKSIN is input to the DATAIN 71 and OCSIN to the CLKIN 73 of item 61 of FIG. 4. These inputs operate to provide an output WBG_COMPLETE signal 75. The output 75 outputs a signal indicating a missing pulse with respect to the input signals 71 and 73. The inverter chain 77 provides programmable delays that may be added before the inverter 79 to tune the delay as might be required in applications. When the two missing pulse detectors are logically joined, the frequency of the LCD CLK' is compared to the reference oscillator.

Figure 6:
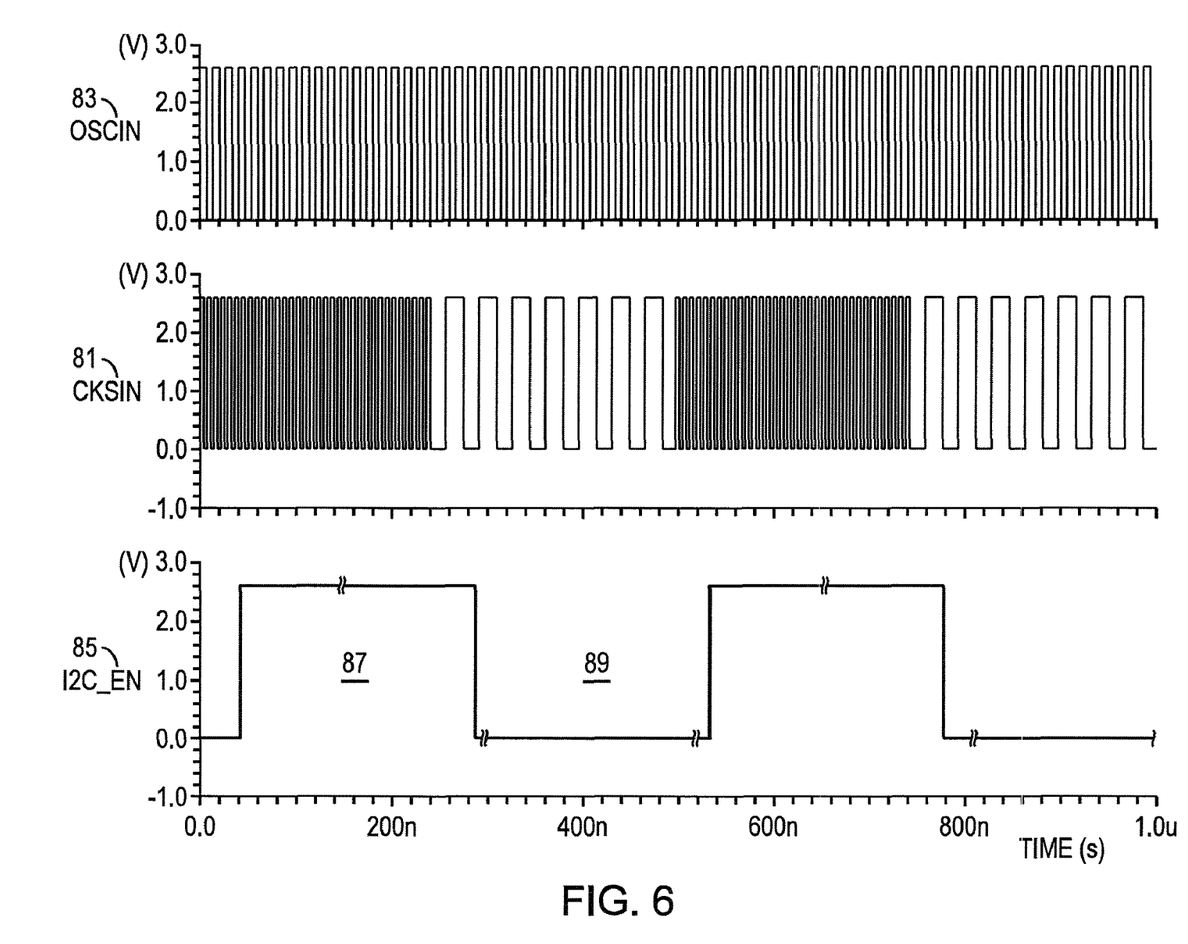
FIG. 6 is a timing chart illustrating the comparing of one frequency to a reference frequency and a corresponding responsive output.

FIG. 6 illustrates a simulation of a serial clock input frequency. CKSIN, 81 compared to a reference oscillator signal, OSCIN, illustratively set at 75 MHz 83. The frequency detection signal 85 illustrates when CKSIN is higher 87 and lower 89 compared to OSCIN 83.

Figure 7:
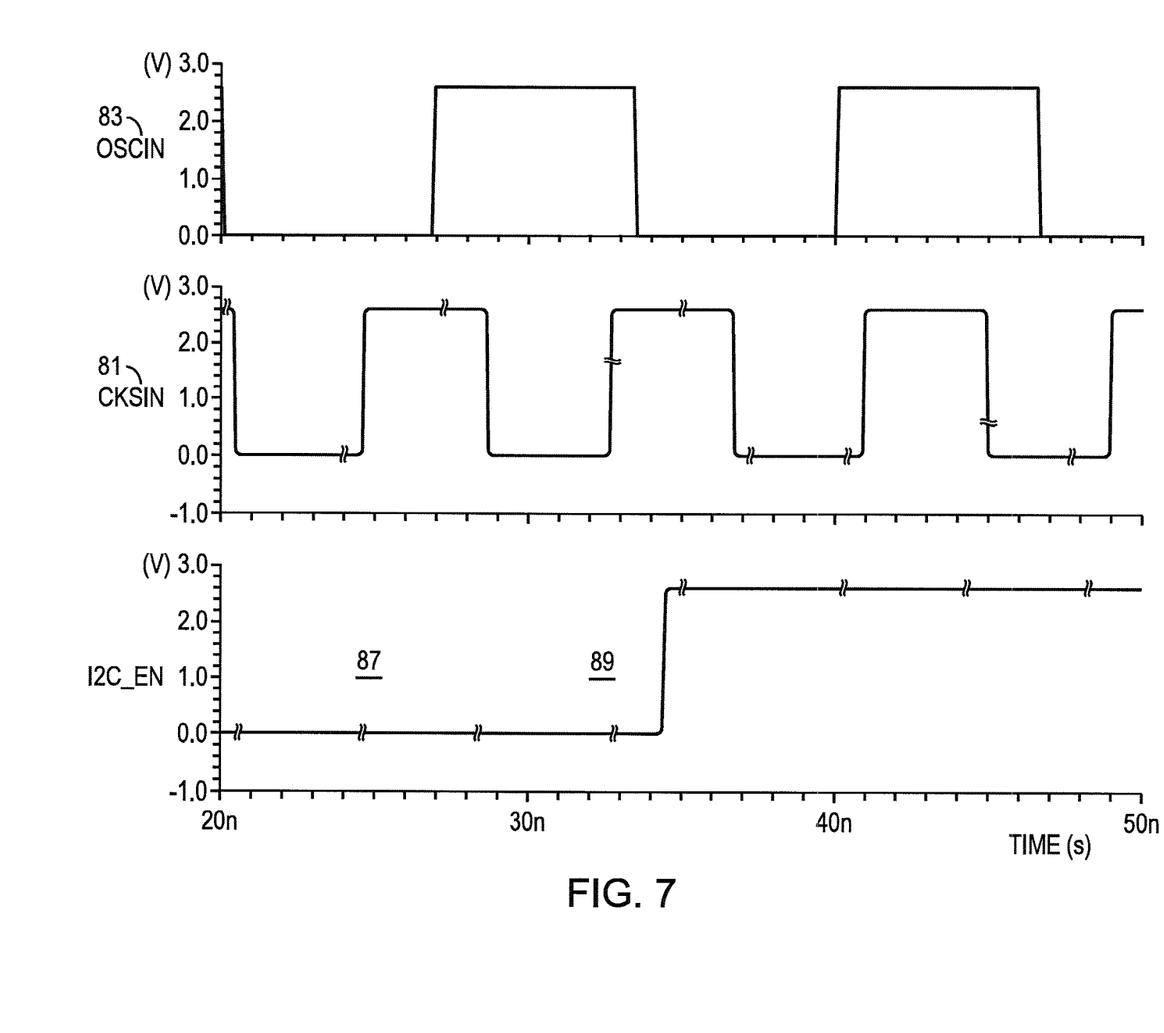
FIG. 7 is a timing chart of FIG. 6 in greater detail.
Figure 8:
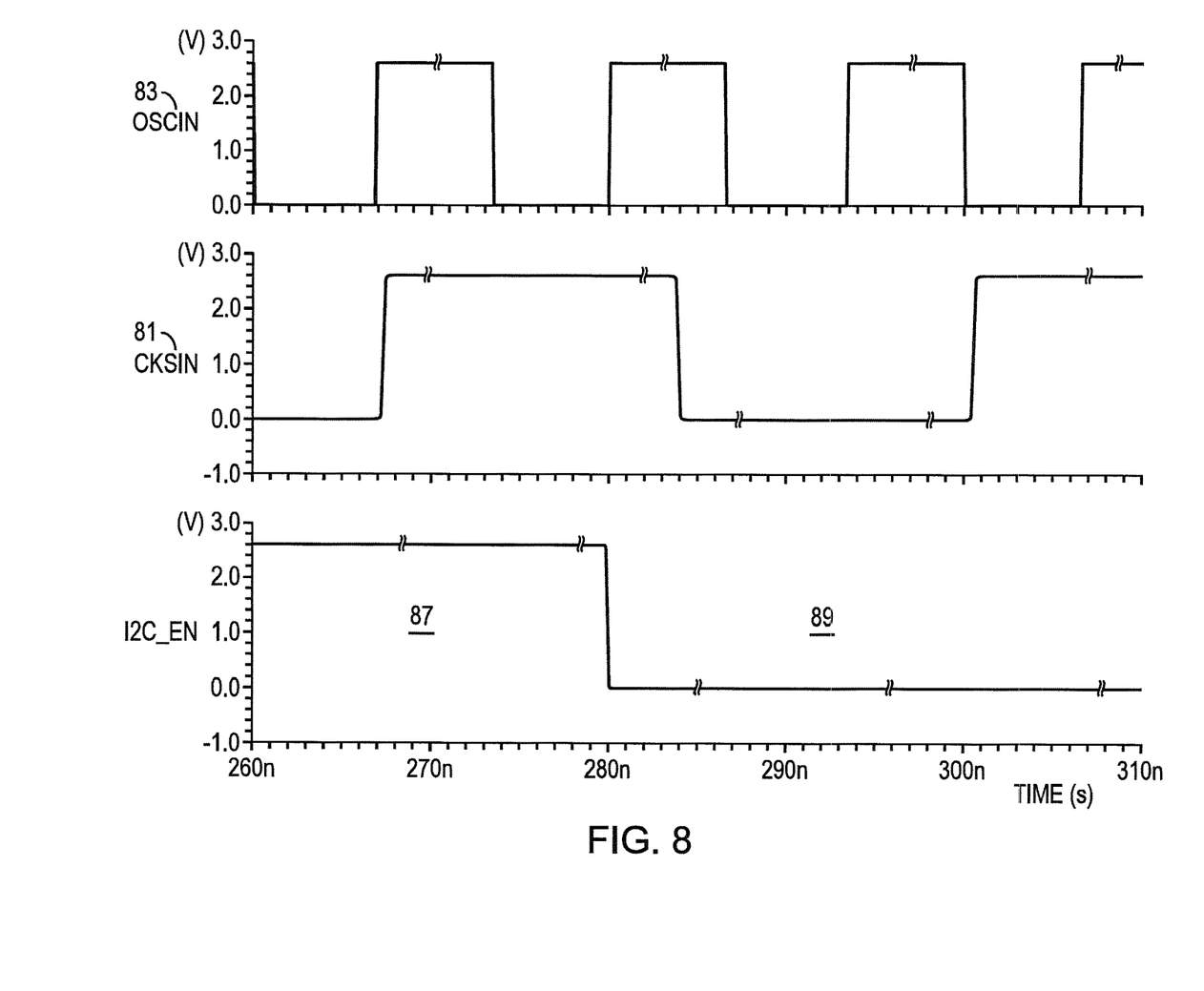
FIG. 8 is a timing chart illustrating the chart of FIG. 6 in greater detail.

FIG. 7 shows the detail of the transition 89 to 87 and FIG. 8 shows the details of the transition 87 to 89.

The present invention provides an advantage, in one preferred embodiment, of using frequency detection for setting different modes. Illustratively, the mode change is between LCD and I2C modes, or from transferring LCD signal to transferring I2C signals across a flex cable, while maintaining the usefulness of the frequency's original intent. There is, at least, one less pin needed on an integrated circuit and/or one less wire needed on the flex cable.

The frequency detection approach provides real time monitoring and multiplexing bidirectional I2C control and LCD data shared over a common serial bus with protection against electromagnetic interference (EMI).

Although the implementation is shown herein as electronic circuits, those skilled in the art will understand that other electronic circuits may perform the same functions, and that systems employing software, firmware and/or hardware and combinations thereof may be used to advantage to accomplish equivalent functions.

Moreover, other processing electronics may be used, including very large scale integration, dedicated special purpose processors, logic circuits including voltage and current types and combinations thereof.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A system for changing modes in electronic apparatus comprising:
a sender transmitting a clock, the clock transmitting, at least first and second frequencies, wherein the first frequency defines a first mode, and the second frequency defines a second mode, and wherein data is transmitted separately from the clock;
a receiver in electrical contact with the sender, wherein the receiver receives the clock; and
a frequency detector constructed in the receiver to receive and detect the clock frequencies, wherein, when the frequency detector detects the first frequency, the frequency detector outputs a signal that defines the first mode, and when the frequency detector detects the second frequency, the frequency detector outputs a signal that defines the second mode.

2. The system of claim 1 wherein the sender outputs additional frequencies, each indicating additional modes.

3. The system of claim 1 wherein the receiver electrical contact comprises a wire in a cable, wherein the signal that defines the modes is not found on a wire in the cable.

4. The system of claim 1 wherein the receiver electrical contact comprises an integrated circuit pin at the sender and an integrated circuit pin at the receiver, wherein the signal that defines the modes is not found on an integrated circuit pin.

5. The system of claim 1 wherein the first mode defines transmitting a first type of data to the receiver, and wherein the second mode defines transmitting a second type of data.

6. The system of claim 5, further comprising:
a logic multiplex structure at the sender that sends the first type of data when the sender transmits the first frequency and the second type of data when the sender transmits the second frequency; and
a logic demultiplexer structure at the receiver, that responds to the frequency detector output signal that directs the first and the second types of data to their respective receiving circuits.

7. The system of claim 1 wherein the frequency detector comprises:
a reference oscillator with an output that lies between the first frequency and the second frequency; and
comparator circuitry that accepts and compares the reference oscillator and the clock and in response, respectively, outputs a signal indicating the first mode or the second mode.

8. A process for changing modes in an electronic apparatus, the process comprising:
transmitting, from a sender, a clock transmitting, at least, a first and second frequencies; and wherein the first frequency defines a first mode, and the second frequency defines a second mode;
transmitting data separate from the clock;
receiving the clock at a receiver;
detecting the received clock frequencies; and
outputting a signal, in response to the detected frequencies, that defines the first and the second modes, respectively.

9. The process of claim 8, further comprising:
transmitting additional frequencies, wherein each additional frequency defines additional modes.

10. The process of claim 8, further comprising:
connecting the sender to the receiver via a wire in a cable, wherein the signal that defines the modes is not found on a wire in the cable.

11. The process of claim 8, further comprising:
connecting the sender to the receiver via an integrated circuit pin at the sender and an integrated circuit pin at the receiver, wherein the signal that defines the modes is not found on an integrated circuit pin.

12. The process of claim 8, further comprising:
transmitting a first type of data to the receiver when in the first mode, and wherein transmitting a second type of data when in the second mode.

13. The process of claim 12, further comprising:
multiplexing at the sender, the first type of data when the sender transmits the first frequency and the second type of data when the sender transmits the second frequency; and
demultiplexing, at the receiver, that responds to the frequency detector output signal, to receive and direct the first and the second types of data to their respective receiving circuits.

14. The process of claim 8 wherein detecting the frequencies further comprises:
generating a reference frequency that lies between the first frequency and the second frequency; and
comparing the reference frequency and the clock frequencies and in response, respectively, outputting a signal indicating the first mode or the second mode.

* * * * *